E. R. CALTHROP.
PARACHUTE.
APPLICATION FILED JULY 31, 1918.
1,295,968.
Patented Mar. 4, 1919.
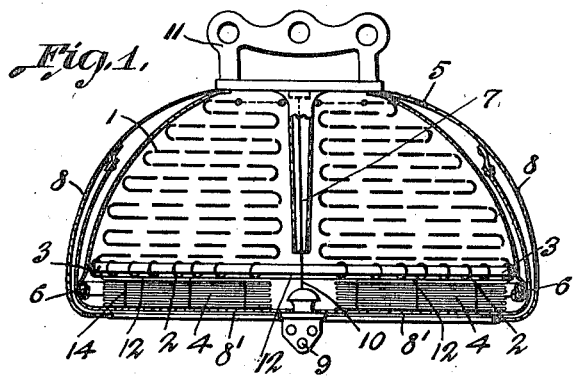
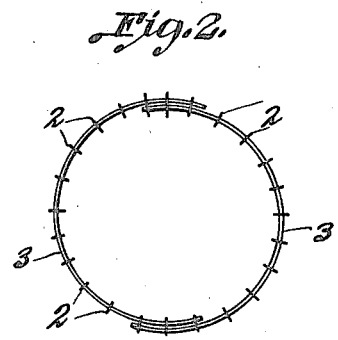
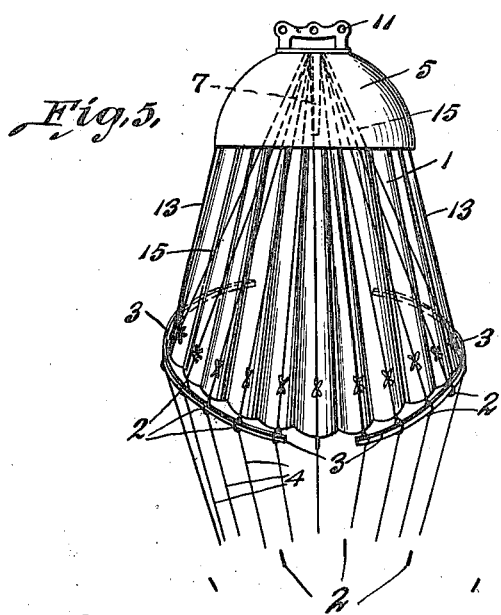
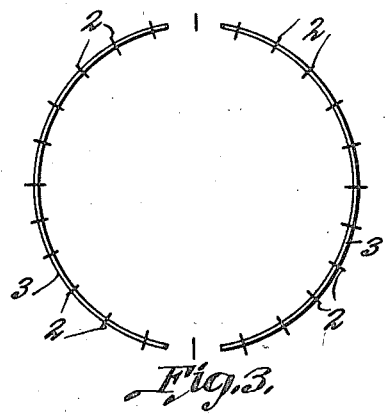
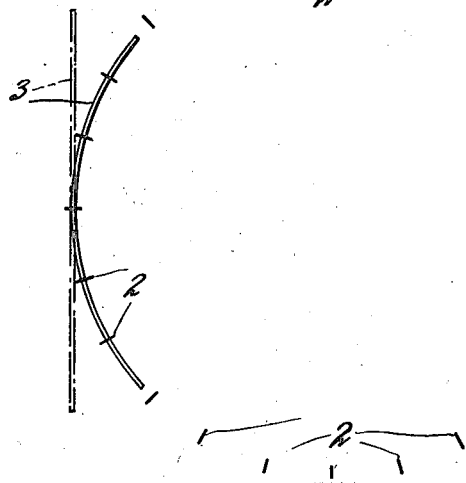
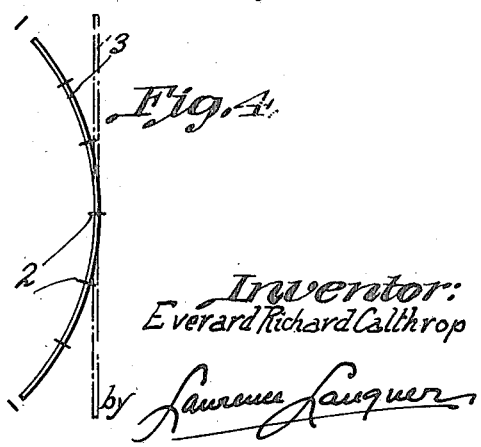
Inventor:
Everard Richard Calthrop
by Laurence Langner
Attorney

UNITED STATES PATENT OFFICE.

EVERARD RICHARD CALTHROP, OF LONDON, ENGLAND, ASSIGNOR TO E. R. CALTHROP'S AERIAL PATENTS LIMITED, OF LONDON, ENGLAND.

PARACHUTE.

1,295,968.        Specification of Letters Patent.        Patented Mar. 4, 1919.

Application filed July 31, 1918. Serial No. 247,509.

*To all whom it may concern:*

Be it known that I, EVERARD RICHARD CALTHROP, a subject of the King of Great Britain, residing at London, in the county of Middlesex, England, have invented new and useful Improvements Relating to Parachutes, of which the following is a specification.

This invention has reference to parachute launching devices of the kind in which the parachute body and its associated parts are normally nested in a case or container and launched therefrom by the application of the load in such a manner as to insure the eventual complete expansion of the parachute body.

The objects I have in view in accordance with the present invention are to provide a parachute launching device which while being certain in operation shall be extremely simple in construction and which will enable the reassemblage of the parachute in its container to be effected in the field with a minimum of trouble.

With these ends in view and such others as may hereinafter appear or are incidental thereto my invention in its broadest aspect may be said to be embodied in a parachute launching device of the kind specified in which the mouth of the parachute body is automatically expanded as it issues from the container by a spring member or members in such a manner as to insure the parachute body entrapping the requisite quantity of air to insure its eventual complete expansion whereupon said spring member or members automatically release the periphery or mouth of the parachute body to permit said body to expand to its full extent and so safely support its load in its descent to the ground.

More specifically regarded the invention consists of a parachute launching device of the kind specified wherein the periphery of the parachute body is detachably engaged with a spring member or members in compression which operate to normally hold said periphery within the container until the load is applied whereupon said periphery is first withdrawn from the container and the aforesaid spring member or members then operate to expand the mouth of the parachute to entrap the requisite quantity of air to insure its eventual complete expansion.

In order that the invention may be readily understood and carried into effect I will now proceed to describe the same fully and with reference to the accompanying drawings in which:

Figure 1 is a view in section of a launching device under this invention showing the container with the parachute nested therein.

Figs. 2, 3 and 4 are diagrams drawn to a smaller scale illustrating respectively the action of the spring member or members within the container upon the first withdrawal of the parachute therefrom and after the further withdrawal thereof and the automatic expansion of the said spring member or members.

Fig. 5 represents diagrammatically and on a smaller scale the parachute body and rigging upon their withdrawal from the container and in the position they assume after the spring member or members has or have accomplished its or their purpose in extending the mouth of the said body so as to entrap the air necessary for the complete expansion thereof, the said figure also illustrating a means of preventing untoward detachment of the spring member or members.

The objects of the present invention may be effected by providing the periphery of the parachute body 1 with a plurality of rings or eyelets 2 and passing therethrough a flat straight spring 3 bent into a circular form but with the ends thereof unsecured. The said rings or eyelets may if desired be carried by the ends of the tapes 4 which constitute the rigging as shown in Fig. 5. As will be seen in Fig. 1 the parachute body 1 and rigging tapes 4 are normally nested in the container 5 which is preferably formed of spun metal with a mouth or rim consisting of a bicycle wheel rim 6 and having a central projecting hollow pillar 7 whereby the assembling of the body 1 is facilitated. The said container with the nested parachute body and rigging therein is inclosed in a water proof envelop 8 substantially as illustrated the under portion 8' of the envelop being carried by the center piece 9 as will be readily understood. The center piece is ordinarily connected with the aviator's harness and is supported when the parachute is nested by means of a readily fracturable cord or stay 10 passing through the central pillar 7 and suitably fastened to the interior of the container 5. The container is attached to the aircraft by means of the handle or carrier 11. The spring members 3 operate when within the mouth of the container 5 to hold the mouth of the parachute body normally against the interior of the mouth of the container the rim 6 of which affords a ready means of preserving the position of the spring members while the parachute is housed or nested in the container. Assuming however that the load is applied to the nested parachute the mouth of the parachute body 1 together with the spring members 3, 3 will be withdrawn from the container 5 and the said spring member or members will owing to their resilient nature incidental to the circular form imparted thereto and hereinbefore referred to expand and bend to assume their original straight condition this action on their part having the effect of opening the mouth of the parachute body. As a consequence of this tendency to straighten and of the increase in diameter of the mouth of the parachute body the continued effort of the members 3 to straighten out in conjunction with the bellying out of the parachute body on its descent obviously enables the rings or eyelets 2 to slip off the ends of the spring members and thereby render the parachute body free to expand to the full extent as indicated in Fig. 4.

The retaining spring member 3 may be constituted of two lengths of spring metal or other material as shown in the example illustrated or a single length of the material bent into a circular form may be employed. The dual form of the device has however been found to give satisfactory results in practice as when the respective parts are bent so as to assume a circular form they readily lend themselves to the inherent action of straightening out thereby effectually and instantly releasing the rings or eyelets 2 when the mouth of the parachute body issues from the mouth of the container 5. This will be rendered clear upon reference particularly to Figs. 2, 3 and 4. In Fig. 2 it is assumed that the mouth of the parachute body is on the point of emerging from the mouth of the container 5 the circular form of the device being preserved and all of the rings or eyelets 2 being threaded thereon. In Fig. 3 the parts of the device are shown as having sprung open to a certain extent and some of the rings or eyelets liberated while in Fig. 4 the springing open or straightening out action has further developed and with the bellying out of the parachute body most of the rings or eyelets have slipped off the springs. The mouth of the parachute body is now in a condition to expand sufficiently to inclose or entrap the necessary quantity of air for insuring its complete expansion.

In some cases in order to prevent displacement of the parachute when assembled within its container there may be provided a number of light readily fracturable threads 12 arranged across the mouth of the said container.

With a view to affording a certain amount of regulation of the action of the spring members 3 they may be formed of metal or material of varying resiliency so that by selecting springs of suitable strength the opening of the mouth of the parachute body may be retarded or expedited as the case may be or as may be desired.

The spring members may be loosely arranged in relation both to the parachute body and the container or they may each be attached to a rigging tape 4 in which case they would fall along with the parachute. They may however be attached by cords such as indicated at 13 (Fig. 5) to the rim or other convenient part of the container so that when they have fallen a certain distance their further descent will be arrested and they will then remain behind with the container on the aircraft. Obviously the said member may be a single or a multi-part device as may be found suitable or desirable.

As shown in Fig. 5 the rings or eyelets 2 are secured to the periphery of the mouth of the parachute body 1 and the tapes 4 pertaining to the rigging are in turn attached to the said rings or eyelets which latter are also connected by breaking cords 15 with the container 5. This is a very convenient arrangement as it insures freedom of action for the spring member 3 and also for the tapes of the rigging. The latter are arranged in packs as described in the aforesaid prior specification and therefore readily disengage themselves from the temporary retaining bands 14 (Fig. 1) upon the launching taking place.

With the improved parachute launching device according to the present invention little trouble will be experienced upon alighting in reassembling the parachute in the field for further use as it is only necessary to exercise care in so arranging the parachute body 1 loosely within the container 5 that a central channel is formed to allow the air to gain immediate access to the interior of the parachute body for the whole of the length of the successive folds thereof from the periphery to the apex when the parachute is again launched from the aircraft and to pass the spring member or members 3 through the rings or eyelets 2 to hold the periphery or mouth of the said body 1 against the interior of the mouth of the container 5 as hereinbefore described. In thus assembling the parachute body within the container the central pillar 7 will be found to assist as it will enable the said body to be placed in regular successive symmetrical folds within the container whereby it is preserved in condition for instantaneous release when again required for use.

The rigging of a parachute for use under this invention is preferably composed of tapes arranged in packs as herein referred to in which case the lower cover 8' with which the cover 8 of the container is provided forms a support for the packed rigging as will be understood from the said prior specification but it is obvious that the rigging may be of any other appropriate type.

I claim:—

1. In a parachute launching device, the combination with a parachute body and its accessory parts and a case or container having a retaining portion, in which case or container the said body and parts are normally nested or housed and from which the parachute is launched by the application of the load, of spring or yielding means connected with the parachute body adapted to automatically expand the mouth of the parachute body as the latter issues from said case or container, said spring means co-operating with said retaining portion of the casing or container and by its expansion normally retaining the parachute body in said casing or container.

2. In a parachute launching device the combination with a parachute body and its accessory parts and a case or container in which the said body and parts are normally nested or housed and from which the parachute is launched by the application of the load of a detachably arranged spring member or device in compression adapted to normally hold the parachute body within the container but upon the load being applied to yield sufficiently to permit the withdrawal from the container of the mouth of the said body and then to automatically expand, whereupon said spring device is removed from the parachute body.

3. In a parachute launching device the combination with a parachute body and its accessory parts and a case or container in which the said body and parts are normally nested or housed and from which the parachute is launched by the application of the load of a detachably arranged spring member or device in compression having the ends unsecured and applied to the mouth of the said body and a plurality of rings or eyelets on the parachute through which the said spring member or device is threaded and whereby it assumes a circular form.

4. In a parachute launching device the combination with a parachute body and its accessory parts and a case or container in which the said body and parts are normally nested or housed and from which the parachute is launched by the application of the load of a detachably arranged spring member or device in compression having the ends unsecured and applied to the mouth of the said body and a plurality of rings or eyelets on the tapes constituting the rigging of the parachute through which rings or eyelets the said spring member or device is threaded and whereby a circular form is imparted thereto.

5. In a parachute launching device the combination with a parachute body and its accessory parts and a case or container in which the said body and parts are normally nested or housed and from which the parachute is launched by the application of the load of a detachably arranged spring member or device in compression having the ends unsecured and applied to the mouth of the said body a plurality of rings or eyelets on the parachute through which rings or eyelets the said spring member or device is threaded and whereby it assumes a circular form and light retaining threads in the mouth of the parachute body.

6. In a parachute launching device the combination with a parachute body and its accessory parts and a case or container in which the said body and parts are normally nested or housed and from which the parachute is launched by the application of the load of a detachably arranged spring member or device in compression having the ends unsecured and applied to the mouth of the said body a plurality of rings or eyelets on the tapes constituting the rigging of the parachute through which rings or eyelets the said spring member or device is threaded and whereby a circular form is imparted thereto and light retaining threads in the mouth of the parachute body.

7. In a parachute launching device the combination with a parachute body and its accessory parts and a case or container in which the said body and parts are normally nested or housed and from which the parachute is launched by the application of the load of a detachably arranged spring member or device in compression and varying resiliency adapted to normally retain the parachute body in the said container and to automatically expand the mouth of the parachute body as the latter issues therefrom.

8. In a parachute launching device the combination with a parachute body and its accessory parts and a case or container in which the said body and parts are normally nested or housed and from which the parachute is launched by the application of the load of a detachably arranged spring member or device in compression adapted to normally retain the parachute body in the said container and to automatically expand the mouth of the parachute body as the latter issues therefrom and means for attaching the said spring member or device to the rigging tapes or to the container.

E. R. CALTHROP.